United States Patent Office 3,002,889
Patented Oct. 3, 1961

3,002,889
METHOD OF PRODUCING L-GLUTAMIC ACID
Shukuo Kinoshita, Katsunobu Tanaka, and Sadao Akita, Tokyo, Japan, assignors to Kyowa Hakko Kogyo Co., Ltd., Chiyoda-ku, Tokyo, Japan, a corporation of Japan
No Drawing. Filed June 20, 1960, Ser. No. 37,078
9 Claims. (Cl. 195—47)

This application is a continuation-in-part of our co-pending application Serial No. 717,841, filed on February 27, 1958, now abandoned, and entitled: "Method of Producing L-Glutamic Acid."

The invention relates to a method of increasing the yield of l-glutamic acid (or salt thereof) produced by culturing a microorganism in a culture medium containing carbohydrate, nitrogen source and inorganic material. More specifically the present invention provides a new method for increasing the yield of a compound having an l-glutamate radical by culturing in the presence of an optimum amount of biotin a strain belonging to *Micrococcus glutamicus*, the concentration of biotin in the culture medium being material.

In co-pending application Serial No. 714,068, filed February 10, 1958, now abandoned, entitled: "Method of Producing L-Glutamic Acid by Fermentation," a method is disclosed for producing and accumulating l-glutamic acid in a substantial amount by culturing a strain of *Micrococcus glutamicus* in a culturing medium.

According to the present invention, the pH control of the fermentation medium set forth in the afore-mentioned application is needed, and it has been found that the yield of l-glutamic acid is remarkably increased if an optimum amount of biotin is present in the culture medium.

It is the primary object of this invention to provide a novel method of producing l-glutamic acid in higher yields than heretofore obtainable. In addition thereto, biotin is effective for reducing the fermentation period whereby fermentation yield is greatly increased.

According to our investigation, we have also found that there is an optimum range in the amount of biotin present. When the carbohydrate concentration (grams/milliliter) in the medium is from 10 to 15%, i.e. weight/volume, the optimum range of biotin is 1 $\gamma$/liter. Otherwise the production of l-glutamic acid is greatly reduced. It is noteworthy that biotin has an unique effect on l-glutamic acid production.

L-glutamic acid is synthesized through a complicated path from carbohydrate and ammonia. Reasonable fermentation control is especially needed to obtain a high yield of the acid or a salt thereof. In case of this present application, the addition of biotin provides the proper control of the path of glutamic synthesizing reactions.

Investigation was directed to the selection of suitable strains, and it was found that *Micrococcus glutamicus* No. 534 (ATCC No. 13032) and its mutants, such as *Micrococcus glutamicus* No. 541 (ATCC No. 13058), *Micrococcus glutamicus* No. 560, *Micrococcus glutamicus* No. 582, *Micrococcus glutamicus* No. 588, *Micrococcus glutamicus* No. 613 (ATCC No. 13059) and *Micrococcus glutamicus* No. 614 (ATCC No. 13060), were suitable for the above-mentioned purpose. The characters of the above listed strains are tabulated in Table 1.

TABLE 1
*Micrococcus glutamicus* and its mutants

| Strain | Source of Isolation | Comparative Characters | | |
|---|---|---|---|---|
| | | Specific [1] Activity $\Delta E/gr.$ | Color | Optimum Temperature (° C.) |
| M. Glutamicus: | | | | |
| No. 534 | Sewage | 560 | Normal | 28–30 |
| No. 541 | Monocolony isolation of No. 534. | 531 | ---do------- | 28–30 |
| No. 560 | Air | 434 | ---do------- | 30–33 |
| No. 582 | Soil | 380 | ---do------- | 30–33 |
| No. 588 | Animal feces | 570 | ---do------- | 30–33 |
| No. 613 | U.V. mutant of No. 534. | | White | 28–30 |
| No. 614 | ----do------------ | | Yellow | 28–30 |

[1] See Table 4.

According to Bergey's Manual of Determinative Bacteriology, 6th edition, *M. glutamicus* is a species of the genus Micrococcus which is most closely related to *M. aurantiacus* and *M. epidermidis*. A comparison of the three species is set forth in Table 2.

TABLE 2
Comparison of *M. glutamicus* with *M. aurantiacus* and *M. epidermidis*

| Media | *M. aurantiacus* | *M. epidermidis* | *M. glutamicus* |
|---|---|---|---|
| Milk | Weakly acidic | Produces acid | No change to slightly alkaline. |
| Lactose | Produces acid | ------do------ | Does not produce acid. |
| Nutrient | Turbid with pellicle. | Turbid with white ring and sediment. | Slightly turbid, rings are seen sometimes along tube. Flocculent sediment. |
| Nutrient agar | Buff to scant orange-yellow beaded growth, raised, glistening. | White | Moderate growth, milky white to pale yellow. |
| Habitat | Usually isolated from infections but also found in milk, cheese and dust. | Skin and mucous membranes. | Air, soil, sewage. |

As stated in application Serial No. 714,068, referred to supra, page 4, lines 24 to 30, *Micrococcus glutamicus* is a new species of Micrococcus. This is shown below with reference to the "Key to the species of genus Micrococcus" as set forth in Bergey's Manual of Determinative Bacteriology.

I. "Key to the species of genus Micrococcus" from Bergey's Manual, 6th edition:
(1) Aerobic to facultatively anaerobic species.
   *M. glutamicus* is aerobic.
   (B) Nitrites produced from nitrates.
      *M. glutamicus* produces nitrites from nitrates.
(2) Do not utilize $NH_4H_2PO_4$ as a sole source of nitrogen.
   *M. glutamicus* conforms to this description.
   aa. Gelatin not liquefied or very slowly liquefied.
      *M. glutamicus* conforms to this description. In this section, 2 species namely *M. aurantiacus* and *M. epidermidis* are included.

*M. glutamicus* is compared with and differentiated from *M. aurantiacus* and *M. epidermidis* in Table 2. As shown in said table, *M. glutamicus* is different from these two species in pigment on agar, acid production in milk and acid production from lactose.

In addition, in *M. epidermidis*, Voges-Proskauer reaction is positive although in *M. glutamicus*, this reaction is negative. This reaction is an important character according to C. Shaw, J. M. Stit and S. T. Cowan (J. Gen. Microbiol. 5, 1010, 1951).

II. "Key to the genera of family Micrococcaceae" from Bergey's Manual, 7th edition, by Breed, Robert S.; Murray, E.G.D.; and Smith, Nathan R.; published by The Williams & Wilkins Company in Baltimore, Maryland; October 1957:

(1) Aerobic to facultatively anaerobic species. Also includes some obligate anaerobes that occur in packets (Sarcina).

*M. glutamicus* is aerobic.

A. Cells are generally found in irregular masses; occasionally they are single or in pairs.

*M. glutamicus* conforms to this description.

(1) Action on glucose, if any, is oxidative. Aerobic.

*M. glutamicus* is aerobic.

Therefore, *M. glutamicus* belongs to genus (I) Micrococcus.

According to the "Key to the species of genus Micrococcus" in Bergey's Manual, 7th edition:

(1) May or may not reduce nitrates to nitrites. No free nitrogen or nitrous oxide gas produced from nitrates.

*M. glutamicus* conforms to this key.

A. No pink or red pigment produced on agar media in young cultures.

*M. glutamicus* conforms to this key.

(2) Nitrites produced from nitrates.

*M. glutamicus* produces nitrites from nitrates.

In this section, no species is described which does not utilize $NH_4H_2PO_4$ as a sole source of nitrogen. *M. glutamicus* does not utilize $NH_4H_2PO_4$ as a sole source of nitrogen. So, it is clear that *M. glutamicus* is different from any species listed in Bergey's Manual, 7th edition. That means *M. glutamicus* is a new species.

*M. glutamicus* is further distinguished from all the micrococci listed in Bergey's Manual, 6th edition, as set forth in Table 3.

TABLE 3

*Comparison of* M. glutamicus *with other micrococci*

| | A | B | C | D | E | F | G | H |
|---|---|---|---|---|---|---|---|---|
| 1. *M. luteus* | + | − | −* | | | | | |
| 2. *M. ureae* | + | − | −* | | | | | |
| 3. *M. freudenreichii* | + | − | −* | | | | | |
| 8. *M. caseolyticus*** | + | − | −* | | | | | |
| 4. *M. flavus* | + | − | −* | | | | | |
| 5. *M. candidus* | + | − | −* | | | | | |
| 6. *M. conglomeratus* | + | − | + | +* | +* | +* | +* | +* |
| 7. *M. varians* | + | − | + | +* | | +* | +* | +* |
| 8. *M. caseolyticus*** | + | − | + | −* | −* | +* | +* | +* |
| 9a. *M. pyogenes* var. *aureus* | + | − | + | − | orange* | +* | +* | +* |
| 9b. *M. pyogenes* var. *albus* | + | − | + | − | −* | +* | +* | +* |
| 10. *M. citreus* | + | − | + | − | + | +* | +* | +* |
| 11. *M. aurantiacus* | + | − | + | − | orange* | ±* | − | ±* |
| 12. *M. epidermidis* | + | − | + | | −* | | | +* |
| 13. *M. roseus* | + | +* | | | | | | |
| 14. *M. cinnabareus* | + | +* | | | | | | |
| 15. *M. rubens* | + | +* | | | | | | |
| 16. *M. rhodochreus* | + | +* | | | | | | |
| 17. *M. agilis* | +* | | | | | | | |
| 18. *M. aerogenes* | −* | | | | | | | |
| 19. *M. assaccharolyticus* | −* | | | | | | | |
| 20. *M. niger* | −* | | | | | | | |
| 21. *M. grigeroffi* | −* | | | | | | | |
| 22. *M. anaerobius* | −* | | | | | | | |
| *M. glutamicus* | + | − | + | − | + | − | − | − |

A—Relation to free oxygen (+: aerobic to facultatively anaerobic; −: anaerobic).
B—Reddish pigment production on agar.
C—Nitrate reduction to nitrite.
D—Ammonium salt utilization as a sole source of nitrogen.
E—Yellow pigment production on agar.
F—Acid production in milk.
G—Gelatin liquefaction.
H—Acid production from lactose.
*Different from *M. glutamicus*.
**Two strains of *M. caseolyticus* are found in Bergey's Manual of Determinative Bacteriology 6th edition. Each strain is compared in the Table 3.
(In the absence of other definition the + and the − indicate the presence and absence respectively, of the stated characteristic.)

As shown in Table 3, the species of No. 18 to 22 are fundamentally different from *M. glutamicus* in their anaerobic character. The species of No. 13 to No. 17 are definitely differentiated from *M. glutamicus* in their red pigment production. The species of No. 1 to No. 5 are clearly different from *M. glutamicus* in their inability to produce nitrites from nitrates. The species of No. 8 to No. 10 and No. 6 are different in gelatin liquefying character and acid production in milk from *M. glutamicus*. The species of No. 7, No. 11 and No. 12 are different in acid production in milk from *M. glutamicus*. The species of No. 8, No. 9a, No. 9b and No. 11 are also different in pigment production.

In addition, the species of No. 6 to No. 8 are differentiated in their ability to utilize ammonium salt as a sole source of nitrogen in Hucker's medium.

A comparison of l-glutamic acid dehydrogenase activity among various species of genus Micrococcus is given in Table 4. A description of experimental methods follows:

(A) *Preparation of l-glutamic acid dehydrogenase from micrococci cells*

The composition of the culture medium was as follows: meat extract 0.5%, peptone 1.0%, glucose 2.0%, NaCl 0.25%, $K_2HPO_4$ 0.1%, $MgSO_4 \cdot 7H_2O$ 0.025% and yeast extract 0.2%. The pH of the medium was adjusted at 7.0. Organism tested was inoculated in the above medium, and cultured for 20 to 24 hours at 28° C. on a shaking-culture device. After the culture, cells were harvested by centrifugation and washed twice with biological saline water. Washed cells were homogenized by grinding with about twice the amount of fine quartz sands. The homogenate thus obtained was centrifuged for 10 minutes at 10,000 r.p.m. The supernatant was then dialized for 24 hours against M/15 phosphate buffer (pH 7.8) at 0° C. This dializate was used as l-glutamic acid dehydrogenase preparation.

(B.) Assay method for the determination of l-glutamic acid dehydrogenase activity

In the assay of l-glutamic acid dehydrogenase activity, method of Olson and Antinsen (J. Biol. Chem. 197, 67, 1952), was modified. The composition of the test solution was as follows:

0.5 ml. of M/10 l-glutamate solution, 1.0 ml. of coenzyme solution (each 1μ M of TPN and DPN were contained in 1.0 ml. of this solution), and 1.0 ml. of M/15 phosphate buffer, pH 7.8. At zero time, the above test solution and 1.0 ml. of enzyme preparation were mixed in a Beckman spectrophotometric cuvette, and the absorbency at 340 mμ was measured every minute for 6 minutes using Beckman model DU spectrophotometer. The increase of absorbency during five minutes after the first one minute was defined as ΔE. ΔE was proportional to the concentration of the enzyme if the increment of absorbency was lower than 0.070. Specific activity of the enzyme was defined as ΔE/gram of protein in enzyme solution. All the assays were carried out at 30° C.

Results.—The results are shown in Table 4. As seen in the table, *Micrococcus glutamicus* has considerably higher activity of l-glutamic acid dehydrogenase than other known species of Micrococcus, therefore *M. glutamicus* is easily distinguishable from other species.

TABLE 4

*Comparative activities of l-glutamic acid dehydrogenase in various species of genus Micrococcus*

Strain:

| | Specific activity (ΔE/gr. of Protein) |
|---|---|
| M. epidermidis ATCC 155 | 1.4 |
| M. lysodeiticus ATCC 4698 | Trace |
| M. varians ATCC 399 | 6.0 |
| M. citreus ATCC 4012 | 3.0 |
| M. acesolyticus ATCC 8460 | Trace |
| M. sodonensis Aaronson | Trace |
| M. conglomeratus Migula | 28.0 |
| M. pyogenes var. albus Schroeter | Trace |
| M. flavus ATCC 10240 | 75.0 |
| M. glutamicus No. 534 | 560.0 |
| M. glutamicus No. 541 | 531.0 |
| M. glutamicus No. 560 | 343.0 |
| M. glutamicus No. 588 | 570.0 |
| M. glutamicus No. 582 | 380.0 |

The characteristics of *Micrococcus glutamicus*, represented by *Micrococcus glutamicus* No. 534 (ATCC No. 13032), will now be described in detail. The experimental tests were done according to the methods described in the Descriptive Chart of Manual of Methods for Pure Culture Study of American Bacteriologists (9th edition).

Its morphological and physiological characters are as follows:

Slightly ellipsoidal spheres, usually in pairs, but also in single and irregular masses. Size of majority: 0.6–1.2 microns. Elongated forms are seen in some conditions. Not motile, spores are not formed. Gram-positive.

Agar slant: Moderate growth, filiform, dull, pale yellow.

Agar colonies: Circular, smooth, perfect, slightly elevated, pale yellow.

Broth: Slightly turbid, rings are seen sometimes along tube. Flocculent sediment, no odor.

Litmus milk: No change or slightly alkaline.

Gelatine stab: No liquefaction or very faint liquefaction.

Hydrogen sulfide not formed.

Indole not produced.

Starch not hydrolyzed.

Nitrites produced from nitrates.

Catalase-positive.

Urease produced.

Phosphatase-negative.

Voges-Proskauer reaction: Negative to very weak.

$NH_4H_2PO_4$ is not utilized as a sole source of nitrogen in Hucker's medium.

Citrate utilization in Koser's medium is negative.

Casein dissimilation: Negative or very weak.

Reduction of dyes: Methylene-blue, 2,6-dichlorophenolindophenol, Janus green and 2,3,5-triphenyltetrazolium chloride are reduced.

Methyl-red test: Weakly acidic.

Temperature relations: No growth at 47° C., very slight growth at 42° C., good growth at 28–37° C. Optimum temperature is about 30° C.

Optimum pH, between 7 and 8. Growth occurs between 6 and 9.

Acid from glucose, fructose, mannose, sucrose and maltose. No acid from lactose. (See Table 5.)

L-glutamic acid is accumulated in a large quantity aerobically in the presence of carbohydrates, ammonium ion and inorganic salts.

Production of organic acid: α-ketoglutaric acid and lactic acid are produced in glucose media.

Aerobic.

Habitat: Air, soil and sewage.

Reference is made to the paper entitled "Taxonomical Study of Glutamic Acid Accumulating Bacteria, *Micrococcus glutamicus* nov. sp." by S. Kinoshita, K. Nakayama and S. Akita. This manuscript was received by the editorial board of "Bulletin of the Agricultural Chemical Society of Japan," December 1957 (Faculty of Agriculture, University of Tokyo).

Table 5 sets forth the acid production of *M. glutamicus* No. 534 from carbohydrates.

TABLE 5

*Acid production from carbohydrates by Micrococcus glutamicus No. 534*

| Carbohydrates | Agar medium | Liquid medium** | Carbohydrates | Agar medium | Liquid medium** |
|---|---|---|---|---|---|
| Inositol | − | ± | Melezitose | − | − |
| Arabinose | − | ± | Starch | − | − |
| Rhamnose | − | − | Inulin | − | − |
| Xylose | − | ± | Dextrin | − | − |
| Glucose | + | + | Glycogen | − | − |
| Fructose | + | + | Glycerol | − | − |
| Galactose | − | − | Erythritol | − | − |
| Mannose | + | + | Adonitol | − | − |
| Lactose | − | − | Mannitol | −* | −* |
| Sucrose | + | + | Sorbitol | − | − |
| Maltose | + | + | Dulcitol | − | − |
| Trehalose | −* | − | Salicin | −* | − |
| Melibiose | − | − | Aesculin | − | − |
| Cellobiose | − | − | α-Methyl-glucoside | − | − |
| Raffinose | − | − | | | |

+: Acid is produced; −: Acid is not produced; ±: Acid production is doubtful.
*Acid is produced by some other strains of *M. glutamicus*.
**The composition of liquid medium is as follows: peptone 2%, carbohydrate to be tested 1%, distilled water. To 1000 ml. of this solution, 1 ml. of 1.2% bromcresol purple alcohol (95%) solution was added before sterilization. pH of the medium was adjusted to neutrality using NaOH solution.

In view of the foregoing properties and observations, the inventors recognized that *M. glutamicus* No. 534 belongs to a new species of the genus Micrococcus. The classification of *Micrococcus glutamicus* is dependent upon the conditions under which the culture is grown, the criteria considered dominant in establishing the genus, and the classification scheme accepted by the taxonomist. Other investigators may classify the same organism either as a Micrococus, a Brevibacterium, a Corynebacterium or a Bacterium.

It has been found that a highly advantageous fermentation control process can be provided in biochemically complicated fermentation, as in l-glutamic acid fermentation, by the presence in the culture of a proper concentration of biotin.

It is well known that biotin is contained in various natural substances (e.g. egg yoke, kidney, liver, yeast, milk, cane molasses, beet molasses, blackstrap molasses), their extracts (e.g. aqueous liver extract), hydrolyzates (e.g. yeast hydrolyzate), digests (e.g. enzymatic digest of yeast) or the like (e.g. yeast autolyzate, fish solubles and meat scraps). Biotin-containing materials, such as those indicated supra, can be employed in place of pure biotin with substantially equivalent results. Consequently the present invention is not limited to the use of pure biotin.

Various culturing ingredients described in copending application Serial No. 714,068, filed February 10, 1958, can be used in carrying out the present process.

In order that the invention may be more clearly understood, practical examples are given below.

EXAMPLE 1

Strain: *Micrococcus glutamicus* No. 541 (ATCC No. 13058).

SEED CULTURE

Composition of culture medium:

| | Percent by weight |
|---|---|
| Glucose | 2 |
| Peptone | 1 |
| Meat extract | 0.5 |
| Sodium chloride | 0.25 |
| Water | The balance. | pH, 7.0–7.2.
Culturing temperature, 28° C.
Procedure: Shaking culture (220 r.p.m.) with 30 ml. medium in 250 ml. flasks.
Culture duration, 24 hours.

FERMENTATION CULTURE

Composition of culture medium:

| | Grams |
|---|---|
| Glucose | 100 |
| $(NH_4)_2SO_4$ | 2 |
| $K_2HPO_4$ | 1 |
| $KH_2PO_4$ | 1 |
| $MgSO_4 \cdot 7H_2O$ | 0.25 |
| $FeSO_4 \cdot 7H_2O$ | 0.01 |
| $MnSO_4 \cdot 4H_2O$ | 0.01 |

Filled up to 1 liter with water.
Culturing temperature, 28° C.

Biotin was added to this fermentation medium in various concentrations. *Micrococcus glutamicus* No. 541, isolated by monocolony isolation of *Micrococcus glutamicus* No. 534, was employed for the instant experiment, but any *Micrococcus glutamicus*, for example one of those micro-organisms specifically hereinbefore set forth and the mutant of *Micrococcus glutamicus* yield a similar result.

The fermentation medium was subdivided into 30 ml. proportions which were placed into 250 ml. flasks. Sterilization of the medium was carried out in an autoclave at 110° C. for 10 minutes.

3 ml. of seed culture was added to the sterilized fermentation medium and the submerged culture was done with a shaking device. The fermentation was thus carried out under aerobic conditions.

From about 0.5 ml. to about 1.0 ml. of a 10% (by weight) urea solution was added to the fermentation medium at intervals of from about four to about six hours in order to control the pH of said fermentation medium within the range from 6–9.

Table 6, shows the concentration of l-glutamic acid in the fermentation medium at stated intervals after the fermentation was initiated. As is clearly seen from said table, the production of l-glutamic acid was slight and slow in the control experiment but was considerably increased and rapid in the case where $2.5\gamma/l.$ of biotin was added.

TABLE 6

L-glutamic acid concentration (mg./ml.)

| Interval after fermentation initiation, hr. | 24 | 48 | 72 | 96 |
|---|---|---|---|---|
| Biotin added $(\gamma/l.)^*$: | | | | |
| 0 (control) | 0.2 | 7.0 | 16.5 | 18.0 |
| 1.0 | 4.0 | 18.0 | 22.0 | 21.0 |
| 2.5 | 22.5 | 42.4 | 41.8 | 40.6 |
| 5.0 | 18.5 | 32.4 | 31.6 | 27.0 |
| 7.5 | 1.8 | 4.2 | 5.0 | 4.0 |
| 10.0 | 1.6 | 3.6 | 3.2 | 3.0 |

*$\gamma = 10^{-6}$ gram.

It should be noted further that the production of l-glutamic acid decreased when the amount of added biotin was increased beyond $2.5\gamma/l.$ When *Micrococcus glutamicus* No. 541 is employed, the optimum range of biotin is from about 1.0 to about $5.0\gamma/l.$

EXAMPLE 2

The process was identical to that of Example 1 except that *Micrococcus glutamicus* No. 534 (ATCC No. 13032) was employed rather than Micrococcus No. 541. Where the biotin was added in an amount of $2.5\gamma/l.$ an l-glutamic acid concentration of 38.2 mg./ml. was obtained after 48 hours' culturing.

EXAMPLE 3

The process was identical to that of Example 1 except *Micrococcus glutamicus* No. 580 and 150 grams of glucose (in the fermentation culture) were employed rather than *Micrococcus glutamicus* No. 541 and 100 grams of glucose. Where the biotin was added in an amount of $3.0\gamma/l.$ an l-glutamic acid concentration of 52.0 mg./ml. was obtained after culturing for 48 hours.

EXAMPLE 4

The process was identical to that of Example 1 except 10% (based on weight of fermentation culture) of maltose was added in place of glucose. Where the biotin was added in an amount of $3.0\gamma/l.$, an l-glutamic acid concentration of 31.0 mg./ml. was obtained after culturing for 96 hours.

EXAMPLE 5

The process was identical to that of Example 1 except that 1% (based on weight of fermentation culture) of yeast extract was added in place of biotin. After 48 hours' cultivation, a concentration of 22.4 mg./ml. was obtained.

EXAMPLE 6

The process was identical to that of Example 1 except that 1% (based on weight of fermentation culture) of cane molasses was added instead of biotin. After 48 hours' cultivation, a concentration of 24.2 mg./ml. of l-glutamic acid was obtained in the fermentation medium.

EXAMPLE 7

The process was identical to that of Example 1 except that *Micrococcus glutamicus* No. 614 (ATCC No. 13060, a yellow mutant obtained by subjecting *Micrococcus glutamicus* No. 534 to ultra violet irradiation using 15 watt U.V. lamp for 5 minutes at the distance of 50 cm.) was employed instead of *Micrococcus glutamicus* No. 541. When biotin was added to a concentration of 1.0 to 3.0γ/l., favorable results were obtained, and at a concentration of 3.0γ/l., 34.3 mg./ml. of l-glutamic acid was obtained in the fermentation medium after 48 hours' cultivation.

EXAMPLE 8

| | | |
|---|---|---|
| Starch acid-hydrolyzate[1] | ml | 1000 |
| $(NH_4)_2HPO_4$ | gram | 1 |
| $(NH_4)H_2PO_4$ | do | 1 |
| $MgSO_4 \cdot 7H_2O$ | do | 0.5 |
| $MnSO_4 \cdot 4H_2O$ | do | 1 |
| $K_2SO_4$ | do | 1 |

[1] Starch acid-hydrolyzate has been prepared in the following way: 80 l. of water was added to 15 kg. of pure starch, and a hydrolysis was carried out for 30 minutes at the pressure of 1 kg. by adding 213 ml. of sulfuric acid having the specific gravity of 1.8, and after the hydrolysis, water was added so as to make the total quantity to be 100 l. It was then neutralized by adding aqueous ammonia (containing 28.8% of $NH_3$) having the specific gravity of 0.9. This liquid contained 13% of glucose.

The process was identical to that of Example 1 except that 2.5γ/l. of biotin is added to the above mentioned medium. After 48 hours' cultivation, a concentration of 44 mg./ml. of l-glutamic acid was obtained in the fermentation medium.

In order to control the pH of the culturing medium within a range from 6 to 9, neutralizing agents, such as ammonia, compounds containing basic nitrogenous radical [$NH_4OH$, $(NH_4)_2CO_3$, etc.], and caustic alkalis [NaOH, etc.], can be used in place of urea in each of the preceding examples.

EXAMPLE 9

*Micrococcus glutamicus* No. 534 (ATCC No. 13032) was cultured for 12 hours in a glucose-meat extract-peptone-medium by shaking at 28° C. and used as inoculum for the following experiment.

30 ml. of fermentation medium was added to a 250 ml. baffled (Hinton) flask, inoculated with above inoculum, and shaken on a rotary shaker at 220 r.p.m. at 33° C. for 46 hours. The composition of the medium was as follows: 128.0 g. glucose, 5.0 g. urea, 1.0 g. $(NH_4)_2HPO_4$, 1.0 g. $(NH_4)H_2PO_4$, 0.5 g. $MgSO_4$, 0.04 g. $MnSO_4 \cdot H_2O$, 3.0 g. $K_2SO_4$, 2.0 g. $(NH_4)_2SO_4$, 0.01 g. $FeSO_4 \cdot 7H_2O$, 2.5 μg. biotin per liter (water was added to make a total of 1 liter). The medium was sterilized at 120° C. for 5 minutes. The pH was controlled during the fermentation by adding 1 ml. portions of the neutralizing solutions (urea, $NH_3$, or NaOH) as shown in the below listed experiments. The results are shown in the tables.

EXPERIMENT 111-29

| Flask | Glutamic Acid Bio Assay, mg./ml. | Urea Added,[1] percent | NaOH Added,[2] percent |
|---|---|---|---|
| 1 | 38 | 3.4 | |
| 2 | 33 | 3.0 | |
| 3 | 38 | 2.6 | |
| 4 | 42 | 2.2 | |
| 5 | 41 | 2.2 | .9 |
| 6 | 36 | 2.2 | .9 |
| 7 | 36 | 2.2 | .9 |

[1] Urea added as 15% solution.
[2] NaOH added as 8% solution.

EXPERIMENT 111-55

[Incubation 46-48 hrs. Inoculum *Micrococcus glutamicus*]

| Flask | Glutamic Acid Bio assay, Mg./ml. | Urea Added,[1] percent | NH₃ Added,[2] percent | NaOH Added,[3] percent |
|---|---|---|---|---|
| 1 | 29 | 26 | | |
| 2 | 31 | 22 | | |
| 3 | 24 | 22 | | |
| 4 | 24 | 22 | | |
| 5 | 19 | | | |
| 6 | 19 | | 3.2 | |
| 7 | 28 | | 3.2 | |
| 8 | 22 | | 4.8 | |
| 9 | 22 | | 5.2 | |
| 10 | 20 | | 3.0 | 1.6 |
| 11 | 22 | | 3.0 | 1.6 |
| 12 | 18 | | 2.8 | 1.4 |
| 13 | 21 | | 3.4 | 1.8 |
| 14 | 16 | 1.3 | | .7 |
| 15 | 14 | 1.3 | | .7 |
| 16 | 13 | 1.1 | | .5 |
| 17 | 15 | 1.5 | | .7 |
| 18 | 23 | 1.3 | | .7 |
| 19 | 16 | .9 | | .5 |
| 20 | 16 | .9 | | .5 |
| 21 | 22 | 1.3 | | .7 |
| 22 | 24 | | 2.4 | |
| 23 | 21 | | 2.4 | |
| 24 | 31 | | 2.8 | |
| | 31 | | 2.8 | |

[1] Urea added as 15% solution.
[2] $NH_3$ added as 14% aqueous solution.
[3] NaOH added as 8% solution.

EXPERIMENT 111-60

[*Micrococcus glutamicus*]

| Flask | Glutamic Acid Bio assay, Mg./ml. | Urea Added,[1] percent | NH₃ Added,[2] percent | NaOH Added,[3] percent |
|---|---|---|---|---|
| 1 | 41 | 3.9 | | |
| 2 | 39 | 3.9 | | |
| 3 | 38 | 3.9 | | |
| 4 | 27 | 3.9 | | |
| 5 | 27 | | 3.0 | |
| 6 | 27 | | 3.9 | |
| 7 | 27 | | 3.0 | |
| 8 | 27 | | 3.0 | |
| 9 | 32 | | 2.4 | 1.2 |
| 10 | 32 | | 2.4 | 1.2 |
| 11 | 33 | | 2.4 | 1.2 |
| 12 | 36 | | 2.4 | 1.2 |

[1] Urea added as 15% solution.
[2] $NH_3$ added as 21% aqueous solution.
[3] NaOH added as 10.5% aqueous solution.

EXPERIMENT 111-65

| Flask | Glutamic Acid Bio assay, Mg./ml. | Urea Added,[1] percent | NH₃ Added,[2] percent | NaOH Added,[3] percent |
|---|---|---|---|---|
| 1 | 32 | 3.4 | | |
| 2 | 36 | 3.4 | | |
| 3 | 30 | 3.4 | | |
| 4 | 33 | 3.4 | | |
| 5 | 33 | 2.6 | | |
| 6 | 35 | 2.6 | | |
| 7 | 33 | 2.6 | | |
| 8 | | 3.4 | | |
| 9 | 0 | | 1.0 | |
| 10 | 17 | | 1.5 | |
| 11 | 18 | | 2.0 | |
| 12 | 22 | | 2.0 | |
| 13 | 32 | | 2.0 | .9 |
| 14 | 34 | | 2.0 | 1.2 |
| 15 | 31 | | 2.0 | .9 |
| 16 | 31 | | 2.5 | 1.2 |

[1] Urea added as a 15% solution in flasks 1-4 and as a 30% solution in flasks 5-8.
[2] $NH_3$ added as a 16.8% solution.
[3] NaOH added as a 10.5% solution.

EXAMPLE 10

*Recovery of glutamic acid from glutamic acid whole broth*

To 2 liters of glutamic acid broth produced by the method of any of the preceding examples, e.g. Example 3, concentrated sulfuric acid is added until the pH is 3.4. The broth is then coagulated at 87° C. for a period of 5 hours and 20 minutes. 40 grams of supercell are added as admix. The slurry containing supercell and broth is then filtered through a No. 4A porcelain funnel having 40 grams of supercell precoat on it. The filtered cake is washed with three 125 milliliter portions of water, said water being at a temperature of 80° C. The filtration is rapid.

The filtered broth is then concentrated under reduced pressure to about one quarter of its original volume. The thus concentrated filtered broth is then aged at 5° C. for about 20 hours. During this aging period the broth is agitated.

At the end of the aging period the broth is filtered and the precipitate washed with four 54 milliliter portions of water, said water being at a temperature of between 0° to 5° C. The washed precipitate is then air dried, resulting in high purity glutamic acid.

It is thought that the invention and its advantages will be understood from the foregoing description, and it is apparent that various changes may be made in the process without departing from the spirit and scope of the invention or sacrificing its material advantages, the process hereinbefore described being merely illustrative of preferred embodiments of the invention.

We claim:

1. In a method for producing a compound having an l-glutamate radical from carbohydrate material and nitrogen source by culturing at a pH from about 6 to about 9 *Micrococcus glutamicus* in a culture medium, the improvement wherein said culture medium contains from about 1.0 to about 5.0γ of biotin per liter.

2. A method of producing an l-glutamate selected from the group consisting of l-glutamic acid and salts thereof which comprises: (1) culturing *Micrococcus glutamicus* under aerobic conditions and at a pH between 6 and about 9, in a liquid culture medium containing carbohydrate, nitrogen source, inorganic material and from about 1.0 to about 5.0γ of biotin per liter of said medium and (2) recovering the l-glutamate resulting from said culturing.

3. A method according to claim 1 wherein the biotin is in the form of a member selected from the group consisting of (a) biotin, (b) biotin-containing natural substance, (c) extract of biotin-containing natural substance, (d) hydrolyzate of biotin-containing natural substance, and (e) digest of biotin-containing natural substance.

4. A method according to claim 1 wherein the biotin is in the form of yeast extract.

5. A method according to claim 1 wherein the biotin is in the form of cane molasses.

6. In a method for producing l-glutamic acid from carbohydrate material and nitrogen source by culturing at a pH from about 6 to 9 the microorganism corresponding to ATCC 13059 in a culture medium, the improvement wherein said culture medium contains from about 1.0 to about 5.0γ of biotin per liter.

7. In a method for producing l-glutamic acid from carbohydrate material and nitrogen source by culturing at a pH from about 6 to about 9 the microorganism corresponding to ATCC 13060 in a culture medium, the improvement wherein said culture medium contains from about 1.0 to about 5.0γ of biotin per liter.

8. A method of producing l-glutamic acid which comprises: (1) culturing *Micrococcus glutamicus* under aerobic conditions in a liquid culturing medium containing glucose, nitrogen source and from 1.0 to 5.0γ per liter of biotin in the form of a member selected from the group consisting of biotin, biotin-containing natural substance, hydrolyzate of biotin-containing natural substance, extract of biotin-containing natural substance, and digest of biotin-containing natural substance, the pH of said culturing medium being maintained between about 6 and about 9 by the addition thereto of a neutralizing agent; and (2) recovering the l-glutamic acid produced by said culturing.

9. In a method for producing l-glutamic acid from carbohydrate material and nitrogen source by aerobically culturing a microorganism in a culture medium at a pH from about 6 to 9, the improvement wherein said culture medium contains from about 1.0 to about 5.0γ per liter of biotin.

References Cited in the file of this patent

UNITED STATES PATENTS

| 2,749,279 | Smythe et al. | June 5, 1956 |
| 2,776,926 | Sharpe et al. | Jan. 8, 1957 |
| 2,789,939 | Kita | Apr. 23, 1957 |

OTHER REFERENCES

"Bacterial Chemistry and Physicology" by Porter, John Wiley & Sons Inc., New York (1946), pages 698 and 699 relied on.

"Organic Chemistry" by Fieser et al., 3rd ed., Reinhold Publishing Corp., New York (1956), page 1010 relied on.